(12) United States Patent
Mitchell

(10) Patent No.: US 10,411,797 B1
(45) Date of Patent: Sep. 10, 2019

(54) FREE SPACE OPTICAL NODE WITH FIBER BUNDLE

(71) Applicant: SA Photonics, Inc., Los Gatos, CA (US)

(72) Inventor: Greg G. Mitchell, Elk Grove, CA (US)

(73) Assignee: SA Photonics, Inc., Los Gatos, CA (US)

(*) Notice: Subject to any disclaimer, the term of this patent is extended or adjusted under 35 U.S.C. 154(b) by 0 days.

(21) Appl. No.: 16/004,298

(22) Filed: Jun. 8, 2018

(51) Int. Cl.
| | |
|---|---|
| *H04B 10/11* | (2013.01) |
| *G02B 6/42* | (2006.01) |
| *H04B 10/2581* | (2013.01) |
| *H04B 10/40* | (2013.01) |
| *H04B 10/60* | (2013.01) |
| *H04B 10/50* | (2013.01) |

(52) U.S. Cl.
CPC ............ *H04B 10/11* (2013.01); *G02B 6/4246* (2013.01); *G02B 6/4249* (2013.01); *H04B 10/2581* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 4,326,800 A | * | 4/1982 | Fitts | B23K 26/04 250/201.9 |
| 4,867,560 A | * | 9/1989 | Kunitsugu | B23K 26/04 356/139.05 |
| 6,188,472 B1 | * | 2/2001 | Gage | G02B 6/3588 356/73.1 |
| 6,624,916 B1 | * | 9/2003 | Green | H04B 10/11 398/169 |
| 6,763,157 B1 | * | 7/2004 | Williams | G02B 6/43 385/15 |
| 2017/0054499 A1 | | 2/2017 | Graves et al. | |

* cited by examiner

*Primary Examiner* — Darren E Wolf
(74) *Attorney, Agent, or Firm* — Fenwick & West LLP

(57) ABSTRACT

Described is a free space optical (FSO) node capable of communicating with a remote FSO node. The FSO node includes a Tx/Rx subassembly that is capable of simultaneously receiving and transmitting light carrying data, detecting the position/orientation of the received light signals, and aligning the Tx/Rx subassembly to account for misalignments with remote node. The Tx/Rx subassembly includes a central fiber for transmitting and receiving the optical signals so that the signal data can be processed. The Tx/Rx subassembly also includes a bundle of fibers that circumscribe the central fiber and receive a portion of received light signals to detect the position/orientation of the received light signals and align the FSO node with a remote FSO node.

21 Claims, 8 Drawing Sheets

FREE SPACE OPTICAL NODE WITH FIBER BUNDLE

BACKGROUND

1. Field of Art

This application relates to the field of free space optical (FSO) communication, and particularly to the alignment systems within receiving FSO nodes

2. Description of the Related Art

Free Space Optical (FSO) communication is an optical communication technology that uses light propagating in free space to wirelessly transmit data, for example, for telecommunications or computer networking. Free space is a communication medium that can include air, outer space, or vacuum and contrasts with solid communication mediums, such as optical fiber cables. FSO technology is useful where physical connections are impractical due to high costs or other considerations. In contrast with other electromagnetic communication means, FSO signals are more directional. This confers benefits both for communication capacity and for communication privacy. However, the directionality may demand more accurate pointing to maintain a viable FSO communication connection.

Free space often includes light conditions that make FSO communication difficult. For example, an optical signal strong enough to be received by an FSO node in a high light situation (e.g., mid-day) can over power or saturate light sensors in the FSO node in low light situations (e.g., at night). These light conditions may also rapidly change, for example, in an environment with clouds or intermittent rain.

Furthermore, free space often includes environments that are harmful to FSO nodes or the optical signals. For example, environments that FSO nodes operate in can include high amounts of electromagnetic interference (EMI). EMI are disturbances (e.g., changing electrical currents or voltages) that affect an electrical circuit by electromagnetic induction, electrostatic coupling, or conduction. EMI can be generated from man-made sources, such as ignition systems and cellular networks, and natural sources, such as lightning, solar flares, and auroras.

Lastly, FSO communication nodes may operate in unpredictable and rapidly changing situations that make FSO communication difficult. For example, if a FSO node is mounted on a tower, strong winds may move the tower such that the FSO sways with the tower. In another example, an FSO node is mounted on a flying vehicle that communicates with a stationary FSO node. In these and similar situations, the high directionality of FSO technology may require rapid adjustment to maintain a connection as the node moves.

SUMMARY

The system described herein broadly relates to using optical fibers to determine a position of a received light beam. Specifically, the current disclosure describes an alignment system within a free space optical (FSO) node. The alignment system allows the FSO node to adapt to changing conditions of the free space communication environment, such as moving FSO nodes and changing light signal conditions. The alignment system includes a bundle of optical fibers that receives at least a portion of a received optical beam. Based on the amount of light received by each fiber in the fiber bundle, the alignment system can determine a position of a received optical beam. In some embodiments, the fiber bundle surrounds a central communication transmit-and-receive (termed Tx/Rx) fiber that transmits and receives light signals from a remote FSO node. This allows the alignment system to simultaneously communicate light signals and align the FSO node without optical splitters.

The fiber bundle may be advantageous over traditional light detection sensors for several reasons. Firstly, each of the fibers in the bundle can be connected to combinations of optical components to assist in signal position, acquisition, and tracking. For example, each fiber may be connected to an optical splitter that directs a portion of light to a high light detection sensor and directs another portion of light a low light detection sensor. This allows the FSO node to operate in high light and low light situations. Secondly, the fiber bundle protects the alignment electronics of the FSO node from electromagnetic interference (EMI). Traditional alignment systems may directly expose the alignment electronics to the outside environment (which may include EMI) to detect incoming light from a remote FSO node. The fiber bundle can direct incoming light to alignment electronics without directly exposing to the alignment electronics to the outside environment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Described is a free space optical (FSO) node capable of communicating with a remote FSO node. The FSO node includes a Tx/Rx subassembly that is capable of simultaneously receiving and transmitting light carrying data, detecting the position/orientation of the received light signals, and aligning the Tx/Rx subassembly to account for misalignments with remote node. The Tx/Rx subassembly includes a central fiber for transmitting and receiving the optical signals so that the signal data can be processed. The Tx/Rx subassembly also includes a bundle of fibers that circumscribe the central fiber and receive a portion of received light signals to detect the position/orientation of the received light signals and align the FSO node with a remote FSO node.

I. FSO Node

Figure 1:
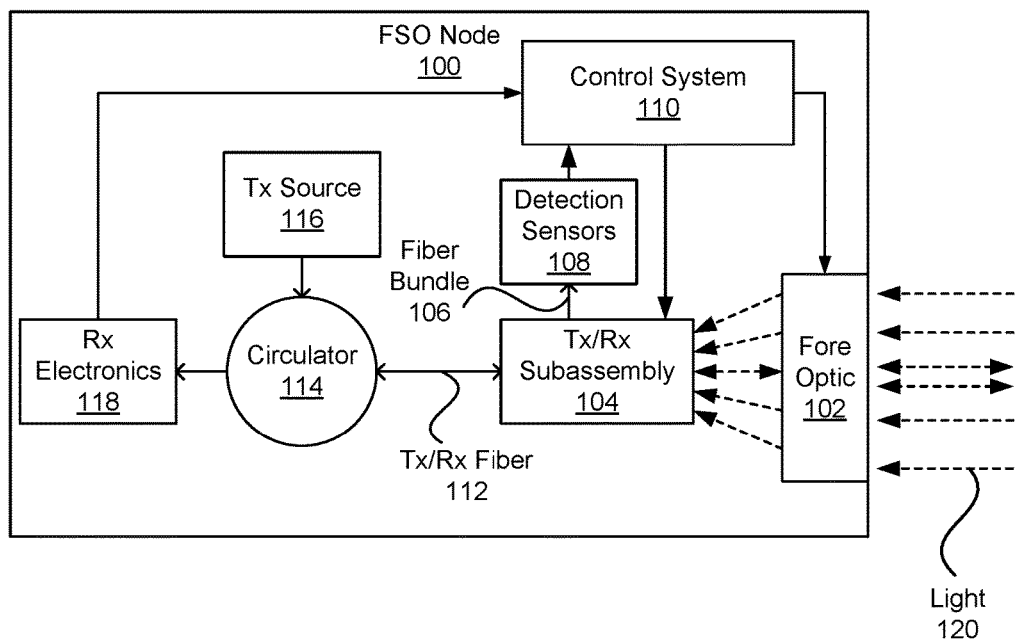
FIG. 1 is a block diagram of a free space optical node (FSO), according to one embodiment.

FIG. 1 is a block diagram of an FSO node 100, according to one embodiment. The FSO node 100 is designed to communicate with a remote FSO node 100 by transmitting and receiving FSO light 120 signals. The FSO node 100 includes a fore optic 102, Tx/Rx subassembly 104, fiber bundle 106, detection sensors 108, control system 110, Tx/Rx fiber 112, circulator 114, Tx source 116, and Rx electronics 118. The fore optic 102 is optically connected to the Tx/Rx subassembly 104. The Tx/Rx subassembly 104 is optically connected to the Rx electronics 118, Tx source 116, and detection sensors 108 by the circulator 114, Tx/Rx fiber 112, and fiber bundle 106. The Rx electronics 118, detection sensors 108, Tx/Rx subassembly 104, and fore optic 102 are electrically connected to the control system 110. In other embodiments, the FSO node 100 may contain additional, fewer, or different components.

The light 120 includes received and transmitted optical signals from FSO nodes 100. The received and transmitted optical signals include encoded communication information from the FSO nodes 100. As indicated in FIG. 1, the light 120 travels bi-directionally in (receive) and out (transmit) of the FSO node 100 through the fore optic 102. The light 120 may also include light from the surrounding environment, such as sunlight. In traveling through free space between FSO nodes 100, the light 120 is susceptible to atmospheric effects, such as scintillation. As a result, the received and transmitted optical signals in the light 120 often include various forms of non-data-signal noise.

When the FSO node 100 is aligned with a remote FSO node 100, the fore optic 102 is an optical component that directs received light 120 signals to the Tx/Rx subassembly 104 and directs transmit light 120 signals from the Tx/Rx subassembly 104 to the remote FSO node 100. For instance, the fore optic 102 may include a lens and/or a beam expander. The position of the fore optic 102 may be physically controlled by the control system 110. For example, based on position information from the detection sensors 108, the control system 110 may adjust the position of the fore optic 102 such that the received light 120 is centered upon the Tx/Rx subassembly 104. The fore optic 102 may be configured to spread, focus, redirect, and otherwise modify the light 120 passing through the fore optic 102. The fore optic 102 may also include optical components configured to reduce external effects not relevant to beam column alignment of the received light 120. For example, the fore optic 102 includes a component that reduces atmospheric scintillation effects. The fore optic 102 may be as simple as a single lens or it may include additional optical components, such as diffusers, phase screens, beam expanders, and lenses. Additional information regarding example fore optic 102 designs that may be used in various embodiments of this description can be found in application Ser. No. 15/243,858 which is incorporated by reference herein in its entirety.

The Tx/Rx subassembly 104 receives light 120 signals directed by the fore optic 102 and transmits light 120 signals from the Tx source 116. As further discussed with reference to FIGS. 2-4, the Tx/Rx subassembly 104 includes an initial end of the Tx/Rx fiber 112 and an initial end of a fiber bundle 106.

Tx/Rx fiber 112 and circulator 114 allow light 120 signals to pass between the Rx electronics 118, Tx source 116, and Tx/Rx Subassembly 104. Through the Tx/Rx fiber 112 and circulator 114, received light 120 signals from the Tx/Rx subassembly 104 are directed to the Rx electronics 118 and transmit light 120 signals from the Tx source 116 are directed to the Tx/Rx subassembly 104. The Tx/Rx fiber 112 can be an optical fiber, such as a single-mode fiber (SMF) or a multi-mode fiber (MMF). Similarly, the circulator 114 can be a single-mode or multi-mode circulator.

The fiber bundle 106 is a bundle of fibers that passes light 120 signals from the Tx/Rx subassembly 104 to the detection sensors 108. The fiber bundle 106 is used for positioning, acquisition, and tracking (PAT). Specifically, light 120 passing through the fiber bundle 106 is used to determine alignment information of the Tx/Rx subassembly 104 in relation to the fore optic 102 and the FSO node 100 in relation to the remote FSO node 100. The fiber bundle will be discussed in greater detail with reference to FIGS. 3-5.

The detection sensors 108 detect the light 120 signals from the fiber bundle 106 and determine alignment information from the received light 120. The detection sensors 108 provide the alignment information to the control system 110. The detection sensors 108 can be photodetectors or other electromagnetic-wave detectors that convert the incoming electromagnetic waves 120 into electrical current. The detection sensors 108 can include light detectors capable of detecting different types of light 120 signals e.g., low and high light intensities, specific wavelengths, etc. This can allow the FSO node 100 to operate in low light (e.g., at night) and high light situations (e.g., at mid-day).

The Rx electronics 118 determines data encoded in the received light 120 signals. The Rx electronics 118 can include photodetectors, such as avalanche photodiodes (APDs), that convert the received light 120 into an electrical signal. The photodetectors may be capable of detecting light 120 in low light and high light situations (e.g., high saturation). The Rx electronics 118 can also include any further electronics and/or computer instructions that process the electrical signal corresponding to the received light 120, which may be embodied in digital or analog circuits, implementing using any one or more of Application Specific Integrated Circuits (ASICs), field-programmable gate arrays (FPGAs), and general purpose computing circuits, along with corresponding memories and computer program instructions for carrying out operations on the data. The specifics of these components are not shown for clarity and compactness of description.

The Tx source 116 converts transmit data into transmit light 120 signals. The transmitted light 120 is sent to the Tx/Rx subassembly 104 via the circulator 114 and Tx/Rx fiber 112. The Tx source 116 can include a laser to produce the transmit light 120 signals. The Tx source 116 can also include any further electronics and/or computer instructions that modulate the transmit light 120 signals and encode the underlying data to be transmitted, including any other physical (PHY) layer or medium access control (MAC) related processes, such as the addition of error correction and so on. Similar to the Rx electronics 118, the Tx source 116 may be embodied in digital or analog circuits, implementing using any one or more of Application Specific Integrated Circuits (ASICs), field-programmable gate arrays (FPGAs), and general purpose computing circuits, along with corresponding memories and computer program instructions for carrying out operations on the data. The specifics of these components are not shown for clarity and compactness of description. In one embodiment, the Tx source 116 and Rx electronics 118 may be the same set of components.

The control system 110 receives input from the Rx electronics 118 and detection sensors 108 to control a position of the fore optic 102 and the Tx/Rx subassembly 104 such that the fore optic 102 directs received light 120 signals to the Tx/Rx subassembly 104. Furthermore, the control system 110 can position the fore optic 102 and the Tx/Rx subassembly 104 such that transmit light 120 signals are transmitted to a remote FSO node 100. For example, the control system 110 may position the fore optic 102 to direct a transmit light 120 signal parallel to a received light 120 signal. In another example, if a remote FSO node 100 is moving, the control system 110 may direct a transmit light 120 signal with an angular bias (referred to as point-ahead bias) to account for the travel time of the transmit light 120 signal.

II.A Tx/Rx Subassembly

Figure 2A:
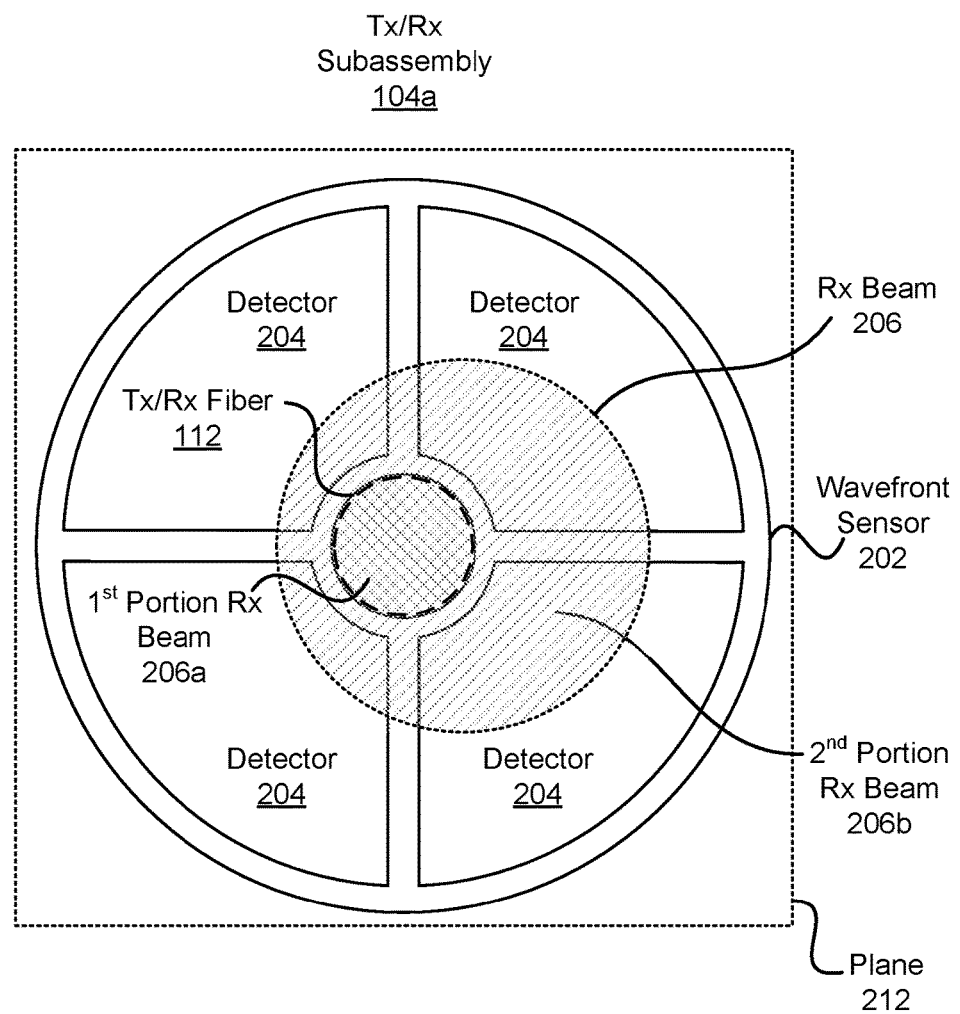
FIG. 2A is a front view of a Tx/Rx subassembly, according to one embodiment.
Figure 2B:
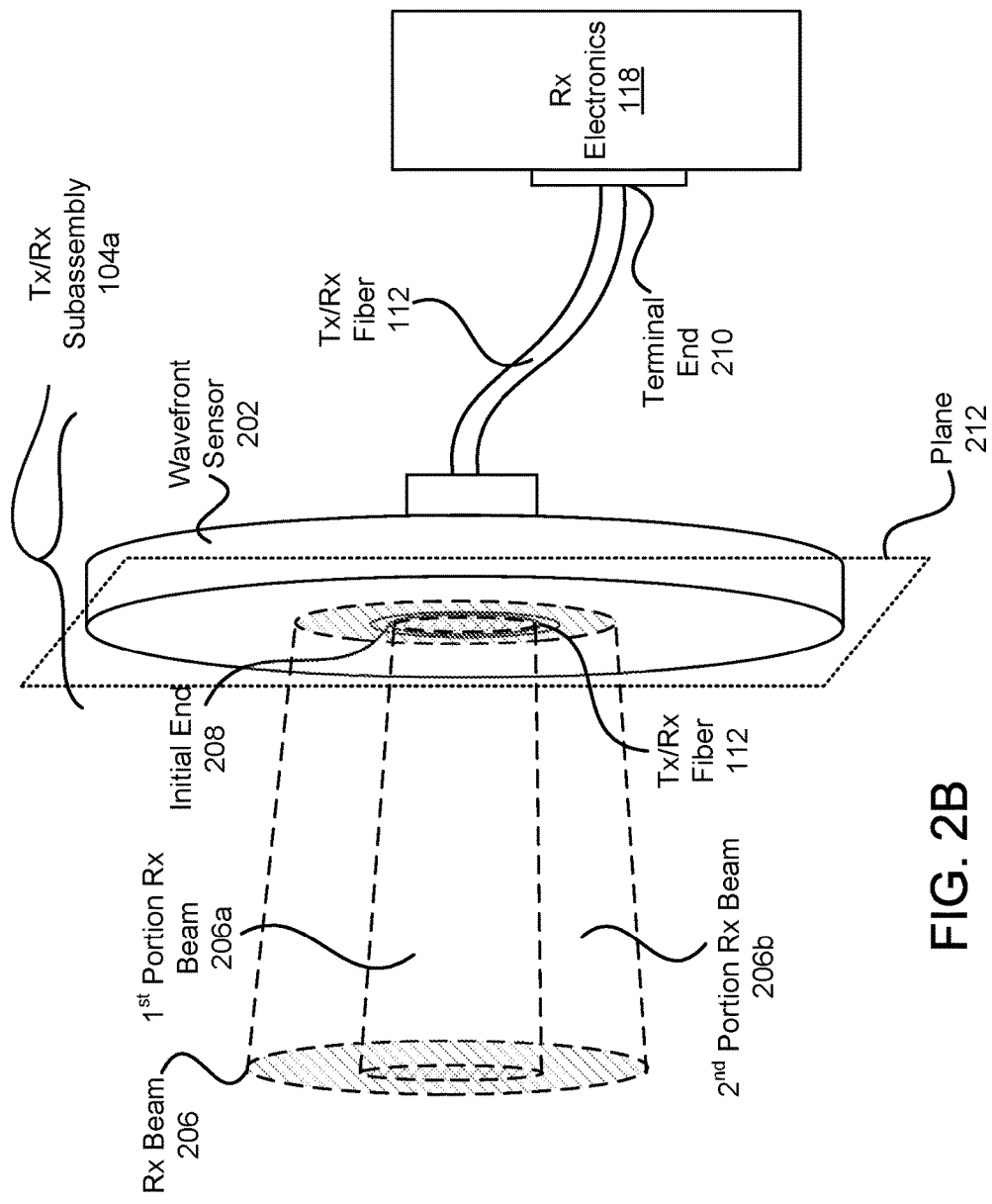
FIG. 2B is a perspective view of the Tx/Rx subassembly connected to Rx electronics, according to one embodiment.

FIG. 2A is a front view of the Tx/Rx subassembly 104a, according to one embodiment. FIG. 2B is a perspective view of the Tx/Rx subassembly 104a connected to Rx electronics 118, according to one embodiment. These two figures have similar reference numerals, and are discussed together in this subsection. The Tx/Rx subassembly 104a allows the FSO node 100 to both align itself and transmit/receive light 120 signals. The Tx/Rx subassembly 104 includes an initial end 208 of the Tx/Rx fiber 112 surrounded by a wavefront sensor 202 in plane 212. The wavefront sensor 202 includes detectors 204. A terminal end 210 of the Tx/Rx fiber 112 is connected to the Rx electronics 118. Additionally, the Tx/Rx subassembly 104 receives an Rx beam 206 with an optical path substantially perpendicular to plane 212. The Rx beam 206 can be said to be divided up into a first portion of the Rx beam 206a and a second portion of the Rx beam 206b, thereby covering different angular portions of the whole beam 206. In other embodiments, FIGS. 2A and 2B may contain additional, fewer, or different components.

The Rx beam 206 is an example received light 120 signal that is directed and/or focused by the fore optic 102, travels perpendicular to plane 212, and contains encoded communication information from a remote FSO node 100. When the FSO node 100 is aligned with the remote FSO node 100, the fore optic 102 directs the Rx beam 206 towards the Tx/Rx subassembly 104a such that the Tx/Rx fiber 112 receives a first portion of the Rx beam 206a and the wavefront sensor 202 receives a second portion of the Rx beam 206b. As such, if no portion of the Rx beam 206 is received by the Tx/Rx fiber 112, then the Rx beam 206 will not include a first portion of the Rx beam 206a. This is not a desirable result, as it means that the FSO node 100 is not capturing the data intended for receipt. In this case, the Tx/Rx subassembly 104a and/or fore optic 102 may be repositioned. Alternatively, if no portion of the Rx beam 206 is received by the Tx/Rx subassembly 104a, then the FSO nodes 100 may be misaligned and a light 120 signal search procedure may be performed by the FSO node 100.

The wavefront sensor 202 lies in plane 212 and is used for signal acquisition and alignment of the FSO node 100 system. To do this, the wavefront sensor 202 detects the position of the received second portion of the Rx Beam 206b on the Tx/Rx subassembly 104a. Based on the detected position of the received second portion of the Rx beam 206b, the FSO node 100 can align itself with a remote FSO node 100, or align optical components of the FSO node 100 (e.g., the Tx/Rx subassembly 104 and the fore optic 102) so that the Rx beam 206 is centered on the Tx/Rx fiber 112. For example, the FSO node 100 aligns the internal optical components such that the second portion of the Rx beam 206b is evenly distributed across all detectors 304. In other embodiments, components other than a wave front sensor may perform position detection, acquisition, and tracking. By way of example, a sensor can be an overmoded guided-wave structure with a means to measure the power in the structure's propagating modes.

The example wavefront sensor 202 is a quad cell detector. Together, the four detectors 204 determine the horizontal and vertical position of the Rx beam 206 on the wavefront sensor 202. If the displacement of the Rx beam 206 on the wavefront sensor 202 is not zero, the FSO node 100 can position the Tx/Rx subassembly 104, the fore optic 102, or the FSO node 100 to reduce or eliminate the displacement. The displacement may be determined or calculated based on a comparison of the detected signals from each detector 204. For example, the ratio of the difference of the Rx beam 206 on each half of the wavefront sensor 202 divided by the whole is used to determine a percentage offset from the center of the wavefront sensor 202. The wavefront sensor 202 may include more, fewer, or different detectors 204.

The wavefront sensor 202 defines a circular cavity with a face at plane 212. The cavity allows the first portion of the Rx beam 206a to be received by the Tx/Rx fiber 112. Additional information regarding the structure of the wavefront sensor 202 and the initial end 208 of the Tx/Rx fiber 112 can be found in application Ser. No. 15/243,800 which is incorporated by reference herein in its entirety.

As described with reference to FIG. 1, the Tx/Rx fiber 112 is an optical fiber that allows first portions of the Rx beam 206a to pass from the initial end 208 to the terminal end 210 to be received by the Rx electronics 118. In some embodiments, the Tx/Rx fiber 112 comprises multiple optical fibers. For example, the Tx/Rx fiber 112 includes a fiber that transmits light 120 signals and another fiber that receives the first portions of the Rx beam 206a. Although the initial end 208 is circumferentially surrounded by the wavefront sensor 202 in plane 212, the initial end 208 may be in front of or behind the wavefront sensor 202.

II.B TX/RX Subassembly with Bundle

Figure 3A:
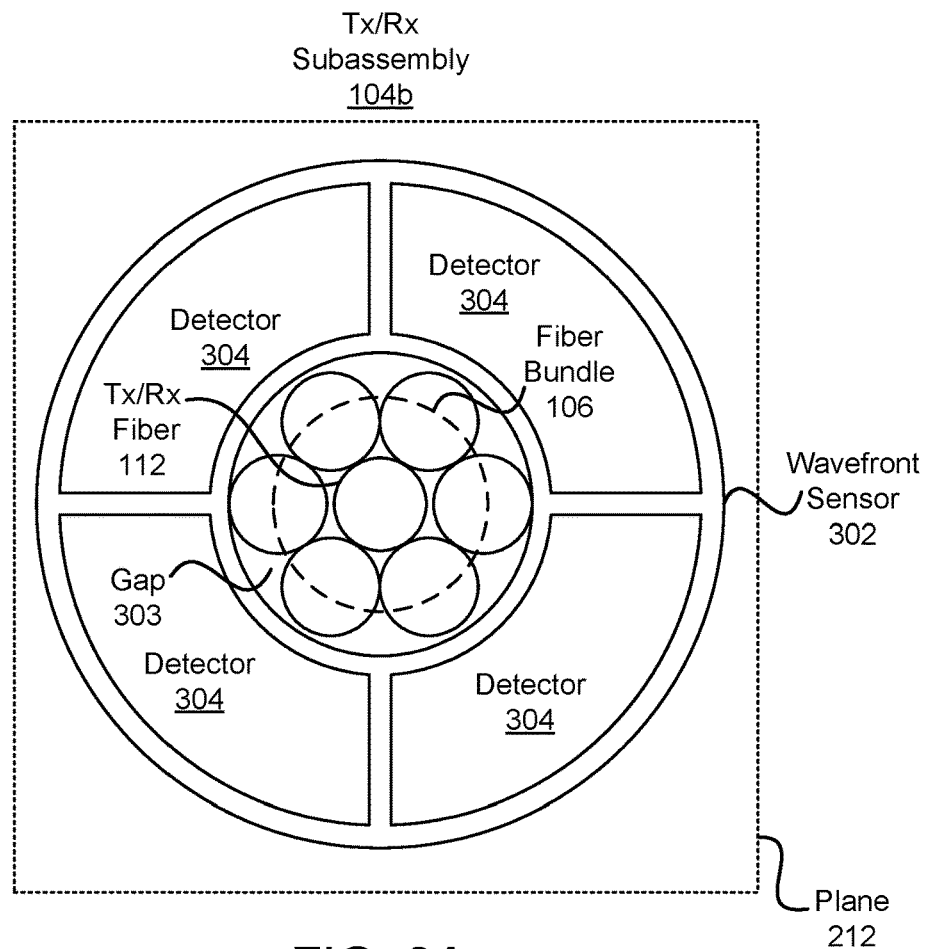
FIG. 3A is a front view of the Tx/Rx subassembly, including a fiber bundle, according to one embodiment.
Figure 3B:
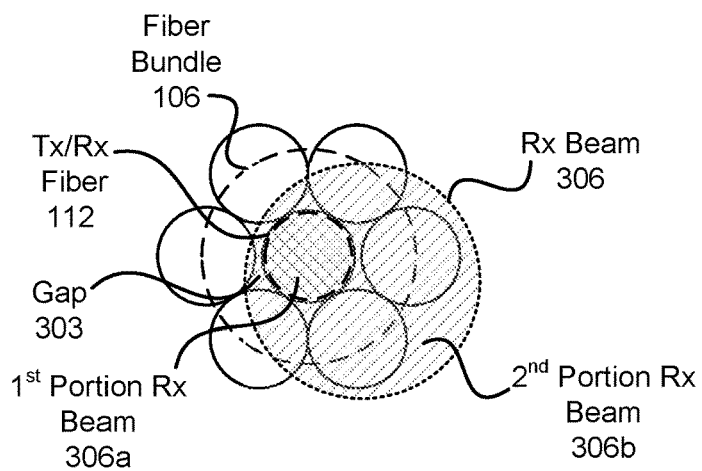
FIG. 3B is a front view of a Tx/Rx fiber and fiber bundle receiving an Rx beam, according to one embodiment.
Figure 3C:
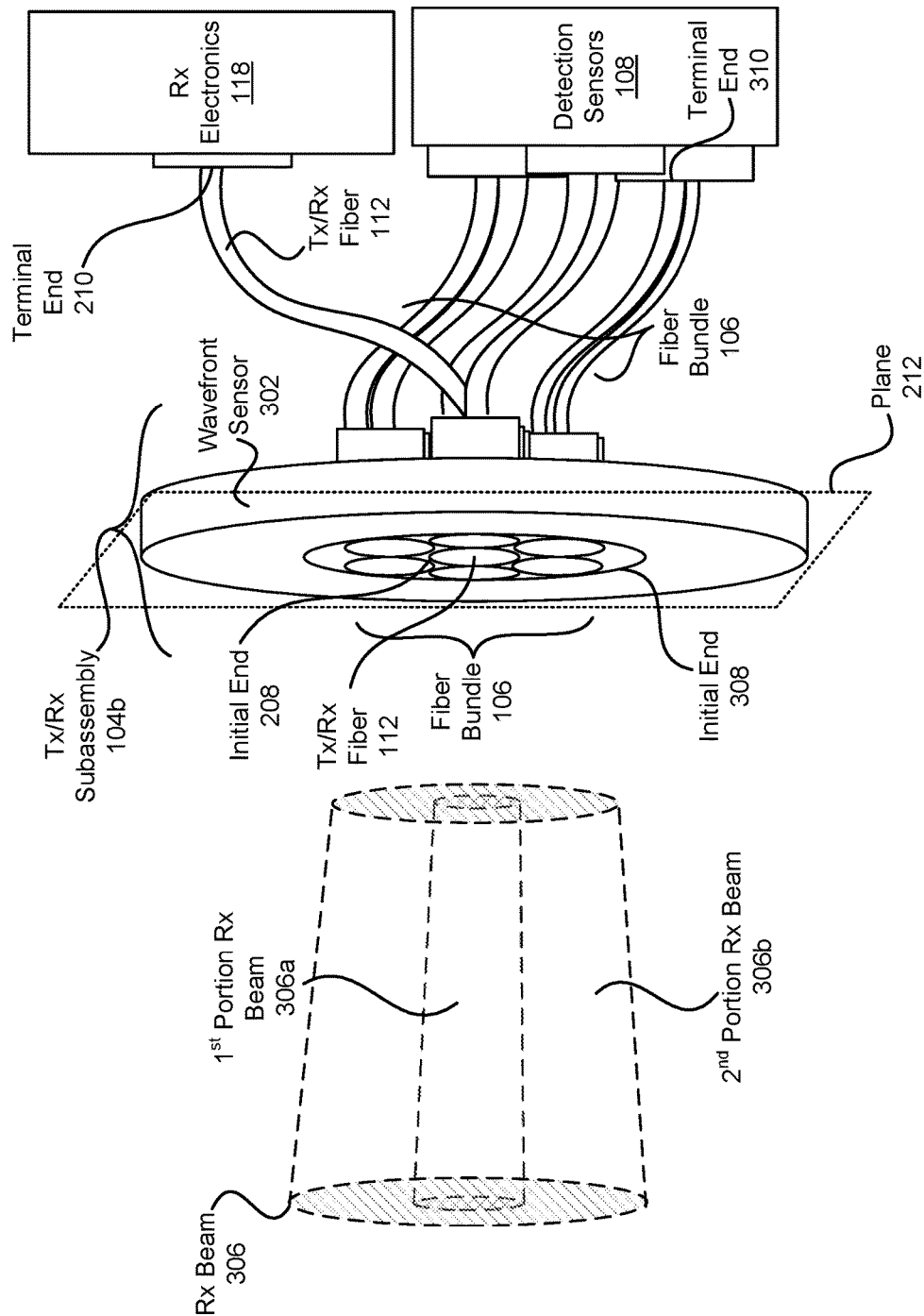
FIG. 3C is a perspective view of the Tx/Rx subassembly, including the fiber bundle, connected to detection sensors, according to one embodiment.

FIG. 3A is a front view of the Tx/Rx subassembly 104b, including a fiber bundle 106, according to one embodiment. FIG. 3B is a front view of the Tx/Rx fiber 112 and fiber bundle 106 receiving an Rx beam 306, according to one embodiment. FIG. 3C is a perspective view of the Tx/Rx subassembly 104b, including the fiber bundle 106, connected to Rx electronics 118 and detection sensors 108, according to one embodiment. These three figures have similar reference numerals, and are discussed together in this subsection. In other embodiments, FIGS. 3A-C may contain additional, fewer, or different components.

In the embodiment of FIGS. 3A-C, Tx/Rx Fiber 112, the fiber bundle 106, and wavefront sensor 302 are physically coupled to each other. Specifically, the Tx/Rx subassembly 104b includes an initial end 208 of the Tx/Rx fiber 112 surrounded by an initial end 308 of the fiber bundle 106. A wavefront sensor 302 surrounds the initial end 308 of the fiber bundle 106 and includes detectors 304. A terminal end 210 of the Tx/Rx fiber 112 is connected to the Rx electronics 118, and a terminal end 310 of the fiber bundle 106 is connected to detection sensors 108. Additionally, the Tx/Rx subassembly 104b can receive an Rx beam 306 with an optical path perpendicular to plane 212. The Rx beam 306 includes a first portion of the Rx beam 306a and a second portion of the Rx beam 306b. Note that the cylinders of the Rx beam 306 indicate that the beams are incident on the Tx/Rx subassembly 104b.

Similar to the embodiment of FIGS. 2A-2B, the Rx beam 306 can be thought of as an example received light 120 signal from the fore optic 102 which includes a first portion of the Rx beam 306a that is received by the Tx/Rx fiber 112 and a second portion of the Rx beam 306b that is received by the fiber bundle 106, when the Tx/Rx subassembly 104b is aligned with the remote node 100. Depending on the alignment of the FSO node 100, the sizes of the various components in the Tx/Rx subassembly 104b, and the size of the Rx beam 306, at least some of the second portion of the Rx beam 306b may also be received by the wavefront sensor 302.

The Tx/Rx subassembly 104b is similar to prior embodiments except that it includes a fiber bundle 106 that surrounds the Tx/Rx fiber 112. As such, the position and orientation of the Tx/Rx subassembly 104b is based on light 120 received by the fiber bundle 106 at the initial end 308 and, possibly, the wavefront sensor 302. In this embodiment, based on light 120 received at the detection sensors 108 through the terminal end 310 of the fiber bundle 106, the control system 110 may adjust the position/orientation of the Tx/Rx subassembly 104b such that the Rx beam 306 is centered upon the initial end 208 of the Tx/Rx fiber 112.

The fiber bundle 106 is a group of optical fibers that, when the Tx/Rx subassembly 104b is aligned, receives the second portions of the Rx beam 306b to detect the position of the Rx beam 306 on the Tx/Rx subassembly 104b. Thus, it replaces (relative to the wavefront sensor 202 from the embodiment shown FIGS. 2A and 2B) or supplements (relative to the wavefront sensor 302) the function of a wavefront sensor 302. The position of the Rx beam 306 on the Tx/Rx subassembly 104b is determined based on quantities of the second portion of the Rx beam 306b that enter the fiber bundle 106. For example, similar to the position calculation with respect to the wavefront sensor 202, the difference of the Rx beam 206 on each half of the fiber bundle 106 can be used to determine an offset from the center of the Tx/Rx subassembly 104b. However, due to the detection sensors 108, an amount of light in each fiber can be determined. Since the location of each fiber in the fiber bundle 106 is known, finer positioning of the Rx beam 306b can be determined compared to the Tx/Rx subassembly 104a without the fiber bundle 106.

Based upon the Rx beam 306 received by the fiber bundle 106, the Tx/Rx Fiber 112, and the wavefront sensor 302, the control system 110 can determine the displacement of the Rx beam 306 from a desired position on the Tx/Rx subassembly 104b. For example, the control system 110 may be instructed to center the Rx beam 306 on the Tx/Rx fiber 112. In another example, due to misalignments in the optics of the FSO node 100, the control system 110 may be instructed to offset the position the Rx beam 306 such that the Rx beam 306 is not centered on the Tx/Rx fiber 112. If the position of the Rx beam 306 on the Tx/Rx subassembly 104b is not desirable, for example not focused on the Tx/Rx fiber 112, the control system 110 can position the Tx/Rx subassembly 104b, the fore optic 102, and/or the FSO node 100 to reduce or eliminate the Rx beam 306 displacement from the desire position on the Tx/Rx subassembly 104b. This allows the FSO node 100 to actively align itself with a remote FSO node 100, even if the remote FSO node 100 is moving relative to the FSO node 100.

Based on the size and number of fibers in the bundle 106, the fibers of the bundle may be self-aligning. In one embodiment, this is accomplished by appropriately choosing the radius of the fibers of the bundle 106 so that when a set (or "layer") of fibers are arranged around a center fiber (e.g., the Tx/Rx Fiber 112), the fibers physically contact each other thereby circumscribing the entire circumference of the center fiber. Thus, each fiber in the bundle 106 is held in place via physical contact, and no explicit step of aligning of fibers in manufacturing is required.

The fiber bundle 106 may be a multi-fiber cable that includes each optical fiber in the fiber bundle 106. In some embodiments the Tx/Rx fiber 112 is a part of the fiber bundle 106. In some embodiments, the fiber bundle 106 includes six optical fibers. The fibers in the fiber bundle 106 may be the same or different than the Tx/Rx fiber 112 and other fibers in the fiber bundle 106. For example, the fibers in the fiber bundle 106 have a larger diameter than the Tx/Rx fiber 112. The fiber bundle 106 may include gaps 303 or dead space between or around the fibers, even in the case where they are self-aligning. The fiber bundle 106 may not completely circumferentially surround the Tx/Rx fiber 112.

The fibers of the fiber bundle 106 offer several advantages over the embodiment of FIG. 2A-2B. As one advantage, the fiber bundle 106 protects the detection sensors 108 from electromagnetic interference (EMI). The embodiment of FIG. 2A-2B, may directly expose the wavefront sensor 202 to the outside environment (which may include EMI) to detect incoming light 120 from a remote FSO node 100. Since the fiber bundle 106 directs incoming light to the detection sensors 108, the detection sensors 108 do not need to be exposed to the outside environment. For example, the detection sensors 108 are a distance away from the Tx/Rx subassembly 104 such that electromagnetic interference (EMI) from the environment is negligible.

The wavefront sensor 302, if present, is generally similar in function to the wavefront sensor 202 described in FIGS. 2A-B. Structurally, the wavefront sensor 302 can have a larger central cavity. Specifically, the cavity is sufficiently large so as to fit around the initial end 208 of the Tx/Rx fiber 112 and the initial end 308 of the fiber bundle 106. Although the cavity is located in the center of the wavefront sensor 302, the cavity may be defined anywhere on the wavefront sensor 302. Alternatively, the wavefront sensor 302 could have a plurality of cavities e.g., to accommodate each fiber in the fiber bundle 106.

In the embodiment of FIGS. 3A-C, Tx/Rx Fiber 112, the fiber bundle 106, and wavefront sensor 302 are configured to receive the Rx beam 306 at the plane 212. However, this is not required. The components 106, 112, 302 can each lie in different or same planes. Furthermore, the initial end 308 of the fiber bundle 106 may itself include several planes. For example, the initial ends of each fiber in the fiber bundle 106 are positioned in different same planes.

III. Fiber Bundle Configurations

Figure 4A:
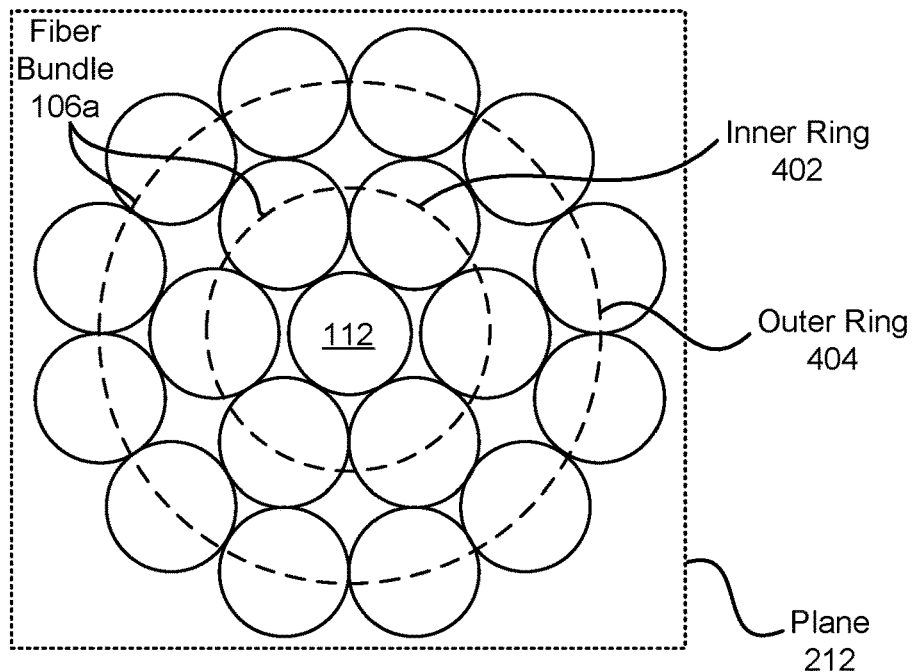
FIGS. 4A-C are front views of different configurations of fiber bundles, according to several different embodiments.
Figure 4B:
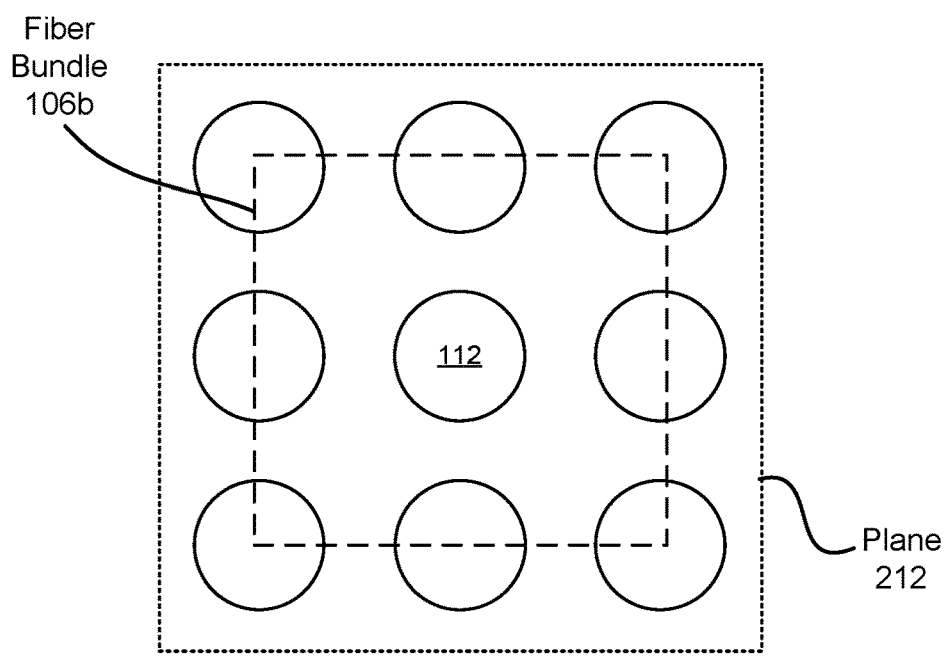
Figure 4C:
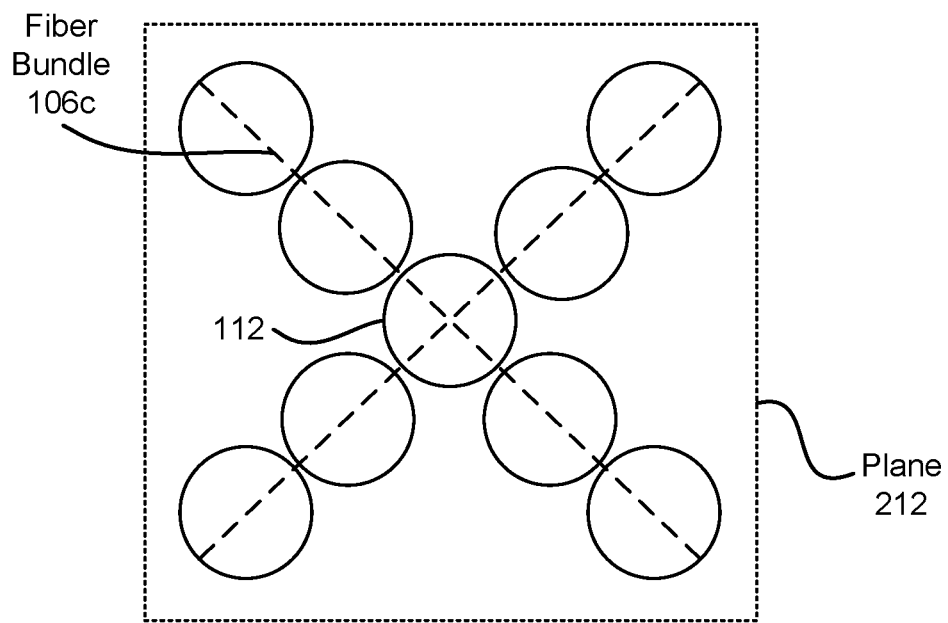

In FIG. 3, the initial end 308 of the fiber bundle 106 surrounds the circumference of the initial end 208 of the Tx/Rx fiber 112 in plane 212. However, other embodiments may include different configurations which allow the position of the Rx beam 306 to be determined. For example, FIG. 4A is a front view of a fiber bundle 106a with an inner ring 402 and an outer ring 404 of optical fibers. In addition to an inner and outer ring, additional rings can be included. In some embodiments, the fiber bundle 106 detects the position of the Rx beam 306 without circumferentially surrounding the Tx/Rx fiber 112. For example, FIG. 4B is a front view of a fiber bundle 106b with a grid of optical fibers evenly spaced apart in plane 212. In another example, FIG. 4C is a front view of a fiber bundle 106c with optical fibers in an "X" pattern.

IV. Optical Splitter

Figure 5:
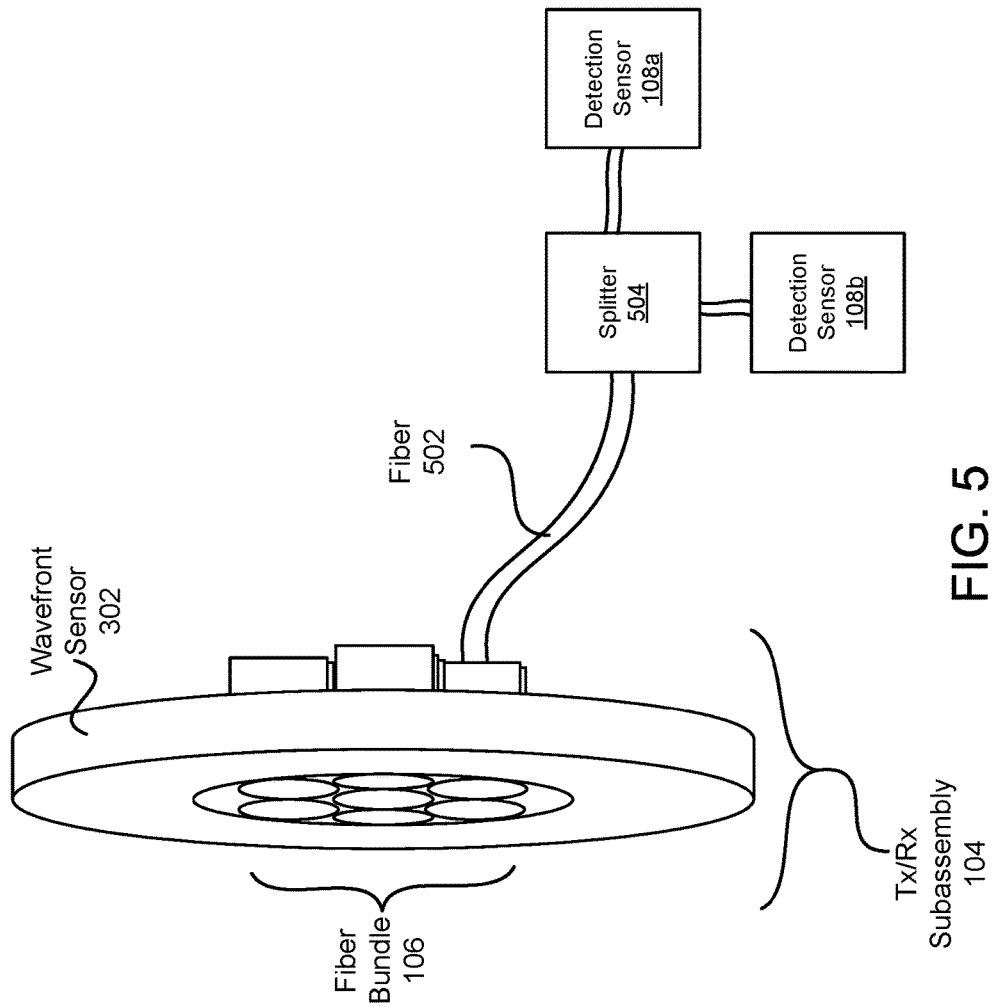
FIG. 5 is a perspective view of a fiber of the fiber bundle that is connected to a fiber splitter and detection sensors, according to one embodiment.

The fibers of the fiber bundle 106 offer several advantages over the embodiment of FIG. 2A-2B. As one advantage, individual fibers can be coupled to other optical components or combinations of optical components, for example, as seen in FIG. 5. In FIG. 5, a fiber 502 from the fiber bundle 106 is coupled to a fiber optic splitter 504. The splitter 504 is optically connected to detection sensors 108a-b and directs a portion of the received light 120 a detection sensor configured for high light situations (e.g., sensor 108a) and another portion of the received light 120 to be directed to a detection sensor configured for low light situations (e.g., sensor 108*b*). In a similar embodiment, the splitter 504 is replaced with an optical switch that directs received light 120 to a high light detection sensor 108*a* or a low light detection sensor 108*b* depending on the conditions of the received light 120 (e.g., high light or low light situations). In other embodiments, filters and/or attenuators may be coupled to one or more the fibers of the bundle to reduce the received light 120 that would otherwise saturate a detection sensor 108. Similarly, amplifiers may be used to amplify the received light 120. As a result, the use of a fiber bundle 106, optical components (e.g., splitter 504), and detection sensors 108 allow the FSO node 100 to dynamically operate in a wide range of environmental conditions.

A low light detection sensor 108 can detect light 120 signals that would otherwise be undetected by other detection sensors 108. A low light detection sensor 108 may have a higher sensitivity to light (but lower saturation point) relative to a high light detection sensor 108. For example, a low light detection sensor 108 may be able to detect low power light 120 signals sent at night. A high light detection sensor 108 can detect light signals that would otherwise saturate other detection sensors 108. A high light detection sensor 108 may have a higher saturation point (but lower sensitivity) relative to a low light detection sensor 108. For example, a high light detection sensor 108 may be able to detect, without saturation, high power light 120 signals sent at mid-day. By way of example, high and low light sensors 108 can be composed of detectors with different sensing areas or different amplification factors. In another example, high light sensors 108 can include detectors with power-attenuation devices to reduce the power applied to the sensor.

For simplicity, only one fiber 502 of the fiber bundle 106 and only the detection sensors 108*a*-*b* connected to the fiber 502 are depicted in FIG. 5. However every fiber of the fiber bundle 106 can be connected to one or more splitters 504 and one or more detection sensors 108. In other embodiments, FIG. 5 may contain additional, fewer, or different components. For example, instead of a single splitter 504, the fiber 502 can be connected to any combination of circulators, splitters, multiplexers, lasers, photodetectors, amplifiers, attenuators, filters, and switches.

V. Additional Considerations

Terms such as "optical" or "light" are not intended to be limited to any one specific wavelength range. Nor are they meant to be limited to the visible region of the electromagnetic spectrum.

Some embodiments may be described using the expression "coupled" or "connected." It should be understood that these terms are not intended as synonyms for each other. The term "connected" indicates that the connected elements are in direct physical, electrical, or optical contact with each other. The term "coupled" includes the case where the coupled elements are in direct physical, optical, or electrical contact but it also includes the case where the coupled elements are not in direct contact with each other, but still co-operate or interact with each other. In particular, there may be intervening elements.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein without departing from the spirit and scope defined in the appended claims.

What is claimed is:

1. A free space optical node configured to receive a received optical beam from a remote free space optical node, comprising:
    a receiving fiber, optically coupled to receive electronics at a terminal end and receiving a first portion of the received optical beam at an initial end, the receive electronics designed to determine data encoded in the received optical beam;
    a fiber bundle comprising at least three fibers optically coupled to detection sensors at a terminal end and receiving a second portion of the received optical beam at an initial end, the detection sensors designed to determine position information of the received optical beam on the fiber bundle;
    a fore optic that includes one or more optical components positioned along an optical path of the received optical beam, wherein the one or more optical components focus the received optical beam towards the receiving fiber and the fiber bundle; and
    a control system which controls a position of at least one optical component of the fore optic such that the fore optic directs the first portion of the received optical beam to the initial end of the receiving fiber and the second portion of the received optical beam to the initial end of the fiber bundle, the control of the position based on the position information.

2. The free space optical node of claim 1, wherein a first plane defined by the initial end of the receiving fiber and a second plane defined by the initial end of the fiber bundle are the same plane.

3. The free space optical node of claim 1, wherein the position information, from the detection sensors of the fiber bundle, is used by the control system to position the at least one component of the fore optic such that the first portion of the received optical beam is directed to the initial end of the receiving fiber.

4. The free space optical node of claim 1, wherein the control system controls positions of the initial end of the receiving fiber and the initial end of the fiber bundle such that the first portion of the received optical beam travels to the initial end of the receiving detector and the second portion of the received optical beam travels to the initial end of the fiber bundle.

5. The free space optical node of claim 1, wherein the receiving fiber is physically surrounded by the fiber bundle.

6. The free space optical node of claim 5, wherein the fiber bundle is self-aligning.

7. The free space optical node of claim 5, wherein the fiber bundle forms a circular ring.

8. The free space optical node of claim 7, wherein the fiber bundle forms two rings, an inner ring and an outer ring.

9. The free space optical node of claim 1, wherein the fiber bundle includes six fibers.

10. The free space optical node of claim 1, further comprising a wavefront sensor circumscribing the fiber bundle and receiving at least some of the second portion of the received optical beam.

11. The free space optical node of claim 1, wherein at least one fiber of the fiber bundle is connected to an optical component which splits the fiber into at least two optical branches.

12. The free space optical node of claim 1, wherein at least one fiber of the fiber bundle is connected to an optical component which splits the fiber into at least two optical branches, wherein the optical component is a splitter and each of the branches receives some of the received optical beam passing through the fiber.

13. The free space optical node of claim 1, wherein at least one fiber of the fiber bundle is connected to an optical component which splits the fiber into at least two optical branches, wherein the optical component is a switch that is configured to direct all or most of the received optical beam to one branch.

14. The free space optical node of claim 11, wherein one branch is coupled to a high light detection sensor at the terminal end.

15. The free space optical node of claim 11, wherein one branch is coupled to a low light detection sensor at the terminal end.

16. The free space optical node of claim 1, wherein the free space optical node further comprises a Tx source and a circulator, wherein in addition to receiving the received optical beam, the free space optical node is configured to transmit a transmitted optical beam to the remote free space optical node.

17. The free space optical node of claim 16, wherein the transmitted optical beam passes through the receive fiber.

18. The free space optical node of claim 1, wherein the fore optic includes a diffuser.

19. The free space optical node of claim 1, wherein a circulator couples the receiving fiber to the receive electronics.

20. The free space optical node of claim 1, wherein the receiving fiber is a multi-mode fiber.

21. The free space optical node of claim 1, wherein the fore optic includes a lens.

* * * * *